(12) United States Patent
Rexberg et al.

(10) Patent No.: US 12,744,313 B2
(45) Date of Patent: Sep. 22, 2026

(54) METHOD AND TRANSMITTER FOR ANALOG BEAM STEERING

(71) Applicant: Telefonaktiebolaget LM Ericsson (publ), Stockholm (SE)

(72) Inventors: Leonard Rexberg, Hässelby (SE); Örjan Renström, Spånga (SE); Sten Wallin, Enskede (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1025 days.

(21) Appl. No.: 17/915,910

(22) PCT Filed: Apr. 2, 2020

(86) PCT No.: PCT/SE2020/050345
§ 371 (c)(1),
(2) Date: Sep. 29, 2022

(87) PCT Pub. No.: WO2021/201735
PCT Pub. Date: Oct. 7, 2021

(65) Prior Publication Data

US 2023/0155286 A1 May 18, 2023

(51) Int. Cl.
*H04B 7/06* (2006.01)
*H01Q 3/28* (2006.01)
(Continued)

(52) U.S. Cl.
CPC ................. *H01Q 3/30* (2013.01); *H01Q 3/36* (2013.01); *H04B 7/0617* (2013.01);
(Continued)

(58) Field of Classification Search
None
See application file for complete search history.

(56) References Cited

U.S. PATENT DOCUMENTS 4,231,040 A 10/1980 Walker
6,340,948 B1 1/2002 Munoz-Garcia et al.
(Continued)

FOREIGN PATENT DOCUMENTS

CN 1148907 A 4/1997
CN 1753550 A 3/2006
(Continued)

OTHER PUBLICATIONS

Xie, J., "Research of Key Technologies of Beamforming for Millimeter Wave Wireless Communication" (Jan. 15, 2021) (104 pages).
(Continued)

*Primary Examiner* — Pablo N Tran
(74) *Attorney, Agent, or Firm* — Rothwell, Figg, Ernst & Manbeck, P.C.

(57) ABSTRACT

Disclosed is a transmitter configured for analog beam steering, the transmitter comprising a plurality of antenna branches, each having an antenna (326). The transmitter comprises, at each of the antenna branches, a signal splitter (308) for splitting an analog radio signal into a number of beam signals, the number of beam signals equals a number of desired beams to be transmitted. Further, the transmitter comprises, for each of the number of beam signals, a phase shifter (310, 312) for phase shifting the beam signal according to a phase shift setting for that beam and for that antenna branch, the phase shift settings being taken from a single look-up table, and a signal combiner (314) for combining the phase shifted beam signals into one combined signal. Further, the transmitter is arranged for transmitting the combined signal from the antenna (326) of that antenna branch towards a receiver.

18 Claims, 8 Drawing Sheets

(51) Int. Cl.
*H01Q 3/30* (2006.01)
*H01Q 3/36* (2006.01)
*H01Q 1/24* (2006.01)

(52) U.S. Cl.
CPC ......... *H04B 7/0634* (2013.01); *H04B 7/0682* (2013.01); *H01Q 1/246* (2013.01)

(56) References Cited

U.S. PATENT DOCUMENTS

| | | | | |
|---|---|---|---|---|
| 6,404,404 | B1 | 6/2002 | Chen et al. | |
| 7,400,296 | B2 | 7/2008 | Haskell | |
| 9,705,611 | B1 | 7/2017 | West | |
| 10,141,993 | B2 | 11/2018 | Lee et al. | |
| 11,218,203 | B1 | 1/2022 | Lee et al. | |
| 11,791,567 | B2 * | 10/2023 | Corman | H01Q 3/26 455/121 |
| 2005/0206475 | A1 * | 9/2005 | Strull | H03H 11/362 333/124 |
| 2008/0132180 | A1 | 6/2008 | Manicone | |
| 2010/0261440 | A1 * | 10/2010 | Corman | H01Q 15/242 343/756 |
| 2012/0190316 | A1 * | 7/2012 | Martineau | H03F 3/602 333/136 |
| 2014/0049337 | A1 | 2/2014 | Schmidhammer | |
| 2014/0097986 | A1 | 4/2014 | Xue et al. | |
| 2014/0185481 | A1 | 7/2014 | Seol et al. | |
| 2014/0266901 | A1 | 9/2014 | Klemes | |
| 2016/0329935 | A1 | 11/2016 | Singerl et al. | |
| 2017/0085362 | A1 | 3/2017 | Alpert et al. | |
| 2017/0229774 | A1 | 8/2017 | Schuehler et al. | |
| 2018/0279134 | A1 | 9/2018 | Malik et al. | |
| 2019/0252755 | A1 | 8/2019 | Shamsinejad et al. | |
| 2019/0326662 | A1 | 10/2019 | Zimmerman et al. | |
| 2020/0006849 | A1 | 1/2020 | Zhu et al. | |
| 2020/0287608 | A1 | 9/2020 | Trojer et al. | |
| 2021/0210870 | A1 | 7/2021 | Tzadok et al. | |
| 2022/0060231 | A1 | 2/2022 | Jaldén et al. | |
| 2023/0048770 | A1 * | 2/2023 | Brown, Jr. | H03G 1/0023 |
| 2024/0039155 | A1 * | 2/2024 | Jayamon | H01Q 3/40 |
| 2024/0097729 | A1 * | 3/2024 | Adnan | H01P 5/10 |

FOREIGN PATENT DOCUMENTS

| | | | |
|---|---|---|---|
| CN | 107230842 | A | 10/2017 |
| CN | 107528617 | A | 12/2017 |
| CN | 108802668 | A | 11/2018 |
| CN | 110495109 | A | 11/2019 |
| EP | 2584651 | A1 | 4/2013 |
| EP | 2675080 | A1 | 12/2013 |
| JP | 2010-511353 | A | 4/2010 |
| JP | 2013-187578 | A | 9/2013 |
| KR | 10-2009-0086117 | A | 8/2009 |
| KR | 10-2014-0010964 | A | 1/2014 |
| KR | 10-2016-0130947 | A | 11/2016 |
| WO | 2018/119153 | A2 | 6/2018 |
| WO | 2019/098897 | A1 | 5/2019 |
| WO | 2019154423 | A1 | 8/2019 |
| WO | 2019/195426 | A1 | 10/2019 |
| WO | 2019/223865 | A1 | 11/2019 |
| WO | 2021/048551 | A1 | 3/2021 |

OTHER PUBLICATIONS

International Search Report and Written Opinion dated Feb. 3, 2021 in International Application No. PCT/SE2020/050345 (9 pages).

International Search Report and Written Opinion dated Apr. 30, 2021 in International Application No. PCT/SE2020/051166 (10 pages).

Ericsson, “Ericsson and industry partners advance 5G commercial readiness in North America”, Press Release Sep. 11, 2018 (3 pages).

Non-Final Office Action issued in U.S. Appl. No. 17/916,493, on Jul. 22, 2025 (71 pages).

Mishra, D. et al., “Efficacy of Hybrid Energy Beamforming With Phase Shifter Impairments and Channel Estimation Errors”, IEEE Signal Processing Letter, vol. 26, No. 1, Jan. 2019 (5 pages).

Bogale, T. E. et al., “On the Number of RF Chains and Phase Shifters, and Scheduling Design With Hybrid Analog-Digital Beamforming”, IEEE Transactions on Wireless Communications, vol. 15, No. 5, May 2016 (pp. 3311-3326).

Final Office Action issued in U.S. Appl. No. 17/916,493 dated Jan. 30, 2026 (16 pages).

* cited by examiner

METHOD AND TRANSMITTER FOR ANALOG BEAM STEERING

CROSS REFERENCE TO RELATED APPLICATIONS

This application is a 35 U.S.C. § 371 National Stage of International Patent Application No. PCT/SE2020/050345, filed Apr. 2, 2020.

TECHNICAL FIELD

The present disclosure relates generally to a method performed by a transmitter and a transmitter for analog beam steering in a wireless communication network, wherein the transmitter comprises a plurality of antenna branches, each antenna branch comprising an antenna. The present disclosure further relates to computer programs and carriers corresponding to the above methods and transmitters.

Background

To understand the special conditions when discussing analog beamforming at transmitters for wireless transmission of signals it is worthwhile to first take digital beamforming into consideration. Digital beamforming is a technique by which several independent beams can be formed at baseband frequency transferring independent signals over several beams at the same time. Here it is assumed that each antenna branch in an array antenna of the transmitter is equipped with its own radio unit having its own Digital to Analog Converter (DAC). In digital beamforming there is no need for analog phase shifters to steer one or several beams in any direction. This way, several beams that are parallel may be defined at digital baseband, and independent signals may be transmitted in these different beam directions.

However, when only one DAC is available in just one common digital radio, this means that the signal to be transmitted is converted from digital to analog shape before the signal is split into each antenna branch. Therefore, the same signal will be split into each antenna branch, and each antenna will transmit the same signal. In order to steer such a combined signal into a certain beam direction when transmitted over the air, what is called analog beam steering, the signal transmitted from each antenna needs to have its own phase-shift. For this reason, each antenna branch is equipped with its own analog phase shifter.

The resulting beam direction may be altered by uploading phase shift information for each phase shifter on a necessary pace. However, if the beam direction is to be shifted in a fast manner by altering the direction many times over a certain time period, then the digital control signal comprising the phase shift information to the phase shifters may be quite considerable in terms of data transmission.

Therefore, a method has been developed by the present applicant in which a local Look-up Table (LUT) is developed for an existing transmitter, the LUT comprising phase shift information for each involved phase shifter for achieving a certain beam direction for the transmitted combined signal. The table is shared between all of the phase shifters on an RF-level in the radio front end. Then the digital control signal comprising the phase shift information may only need one entry defining a requested beam direction, and a local pointer can use this one entry information to pick the correct phase to be set for each phase shifter. As a result, it is only needed to transport a numeral represented by 5 bits to control the phase shifters to obtain 32 beam directions for example. This 5-bit signal is sent to a central processing unit, CPU, of the transmitter, which CPU looks into the Look-up Table (LUT) and then locally outputs a phase shifter setting to the appropriate phase shifter. This kind of procedure is pretty straight forward for steering an array antenna into pre-defined beam angles.

In some scenarios it may be of interest to define a second beam, as depicted in FIG. 1, or even more beams to be presented to two or several receivers in an analog beam forming setup. Although the same signal would virtually be transported by the transmitter to all of the beams, it may still be a scenario that one would like to support. For this scenario there does not exist any simple solution in the same manner as with just one beam and a LUT, to switch phase shifters into pre-defined positions.

For this scenario, in addition to a phase shifter position also an amplitude taper mechanism would be needed that keeps the antenna pattern at a nice and controlled manner. The combination of different directions and amplitude taper makes the simple LUT strategy for single beam steering become very complicated. So, if existing at all, an existing solution would be to define a multi-dimensional LUT. However, this would require a high degree of memory to be allocated. Also, a lot of processing power would be needed. As shown, there is a need for an analog beam steering method and transmitter that can achieve two or more beams wirelessly transmitted from the transmitter. Further, such a method and transmitter should be simple to use, require little control data to be sent to the phase shifters and little memory at the analog front end.

SUMMARY

It is an object of the invention to address at least some of the problems and issues outlined above. It is possible to achieve these objects and others by using methods and transmitters as defined in the attached independent claims.

According to one aspect, a method is provided for analog beam steering, performed by a transmitter of a wireless communication network. The transmitter comprises a plurality of antenna branches, and each antenna branch comprises an antenna. The method comprises, for each antenna branch, receiving an analog radio signal, the analog radio signal being the same at each of the antenna branches, splitting the analog radio signal into a number of beam signals, the number of beam signals equals a number of desired beams to be transmitted, the number of beams being at least two. Further, the method comprises, for each of the number of beam signals, phase shifting the beam signal according to a phase shift setting for that beam and for that antenna branch, the phase shift settings being taken from a single look-up table that is common for the number of beams, combining the phase shifted beam signals into one combined signal, and transmitting the combined signal from the antenna of that antenna branch towards a receiver.

According to another aspect, a transmitter is provided that is configured for analog beam steering. The transmitter comprises a plurality of antenna branches. Each antenna branch comprises an antenna. The transmitter comprises, at each of the antenna branches, a signal splitter for receiving an analog radio signal, the analog radio signal being the same at each of the antenna branches, the signal splitter further being arranged for splitting the analog radio signal into a number of beam signals, the number of beam signals equals a number of desired beams to be transmitted, the number of beams being at least two. The transmitter further comprises, for each of the number of beam signals, a phase shifter for phase shifting the beam signal according to a phase shift setting for that beam and for that antenna branch, the phase shift settings being taken from a single look-up table, and a signal combiner for combining the phase-shifted beam signals into one combined signal. Further, the transmitter is arranged for transmitting the combined signal from the antenna of that antenna branch towards a receiver.

According to another aspect, a transmitter is disclosed, which is operable in a wireless communication system and configured for analog beam steering. The transmitter comprises a processing circuitry and a memory. Said memory contains instructions executable by said processing circuitry, whereby the transmitter is operative for receiving an analog radio signal, the analog radio signal being the same at each of the antenna branches, and splitting the analog radio signal into a number of beam signals, the number of beam signals equals a number of desired beams to be transmitted, the number of beams being at least two. Further, the transmitter is operative for, for each of the number of beam signals, phase shifting the beam signal according to a phase shift setting for that beam and for that antenna branch, the phase shift settings being taken from a single look-up table that is common for the number of beams, combining the phase shifted beam signals into one combined signal, and transmitting the combined signal from the antenna of that antenna branch towards a receiver.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

The inventors have found out that by splitting the analog radio signal at each antenna branch into a number of beam signals, which equals the number of beams that are to be transmitted, and then doing the phase shift separately for each of the beam signals, and then combining the beam signals of one antenna branch again, it is possible to use the same look-up table as is used for the case when only one beam is to be transmitted. In other words, the analog signal coming into each antenna branch is split into a number of beam signals which is equal to the number of beams that are to be transmitted. Then each of those beam signals per antenna branch is phase shifted by its own phase shifter. The phase shifters then get their phase settings from the same look-up table that was used for the single beam case. As an example, if two beams are to be sent, one in direction 30° and one in 100°, the first phase shifters for each antenna beam take their phase settings from the 30° position in the single look-up table, and the second phase shifters for each antenna beam take their phase settings from the 100° position in the same single look-up table. The phase-shifted signals of the same antenna branch are then combined in a combiner and sent to the antenna of the antenna branch for wireless transmission towards the receiver. As a result, an analog beam steering is achieved that is simple to use, require little control data to be sent to the phase shifters and little memory at the analog front end, and still well-formed beams are formed by the transmitted wireless signals.

Figure 2:
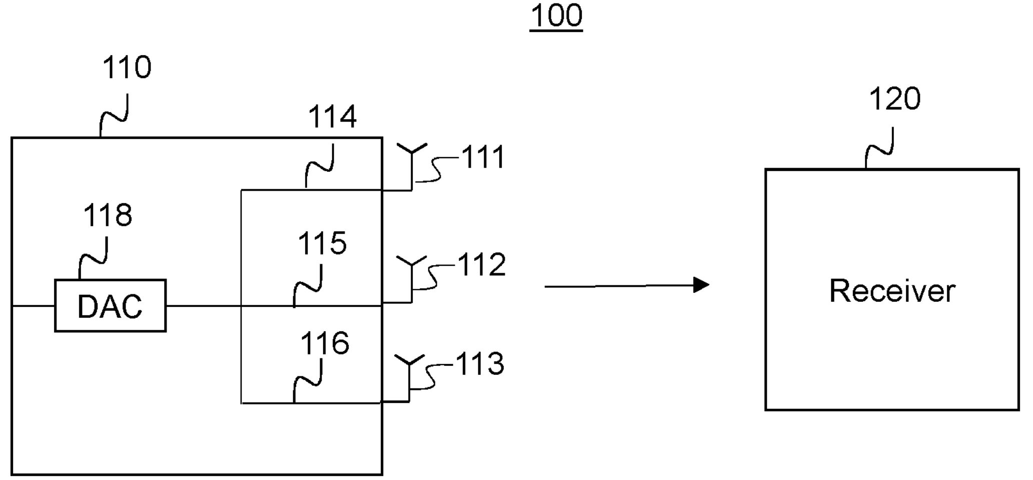
FIG. 2 is a block diagram illustrating a wireless communication network in which the present invention may be used.

FIG. 2 shows a wireless communication network 100 in which the present invention may be used. The wireless communication network comprises a transmitter 110 that is in communication with, or adapted for wireless communication with a receiver 120. The transmitter 110 has a plurality of antennas 111, 112, 113 but only one digital to analog converter (DAC) 118, which means that there can be only one combined signal transmitted wirelessly from the plurality of antennas 111, 112, 113. The transmitter 110 has an incoming line 119 on which the DAC 118 is situated. The incoming line is split after the DAC into a plurality of antenna branches 114, 115, 116, which each end in one of the antennas 111, 112, 113. There is one antenna branch 114, 115, 116 per antenna 111, 112, 113, therefore the name antenna branch. When in use, an incoming signal is received, originating from e.g. a signal generator in the transmitter. The incoming signal is received through the incoming line 119. The incoming signal is converted from digital to analog form in the DAC 118. The converted analog signal is split into the plurality of antenna branches 114, 115, 116, and the analog signal is transmitted from each of the antennas 111, 112, 113. In other words, the same analog signal is sent through each of the antennas 111, 112, 113. In such a transmitter, the combined signal transmitted wirelessly can be steered using analog beam steering, which involves phase shifting the analog signals in the different antenna branches differently.

Figure 3:
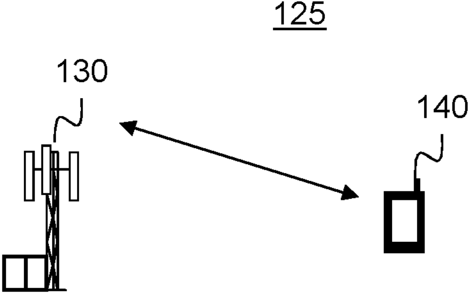
FIG. 3 is another block diagram of a wireless communication network, or scenario, in which the present invention may be used.

FIG. 3 shows an example of another wireless communication network 125 in which the present invention may be used. This network 125 comprises a radio access network node 130 that is in, or is adapted for, wireless communication with a wireless communication device 140. The transmitter 110 of FIG. 2 may be the radio access network node 130 and the receiver 120 of FIG. 2 may be the wireless communication device 140. Alternatively, the transmitter

110 of FIG. 2 may be the wireless communication device 140 and the receiver 120 may be the radio access network node 130.

The wireless communication networks 100, 125 may be any kind of wireless communication network that can provide radio access to wireless communication devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The radio access network node 130 may be any kind of network node that provides wireless access to a wireless communication device 140 alone or in combination with another network node. Examples of radio access network nodes 130 are a base station (BS), a radio BS, a base transceiver station, a BS controller, a network controller, a Node B (NB), an evolved Node B (eNB), a NR BS, a Multi-cell/multicast Coordination Entity, a relay node, an access point (AP), a radio AP, a remote radio unit (RRU), a remote radio head (RRH) and a multi-standard BS (MSR BS).

The wireless communication device 140 may be any type of device capable of wirelessly communicating with a radio access network node 130 using radio signals. For example, the wireless communication device 140 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 4:
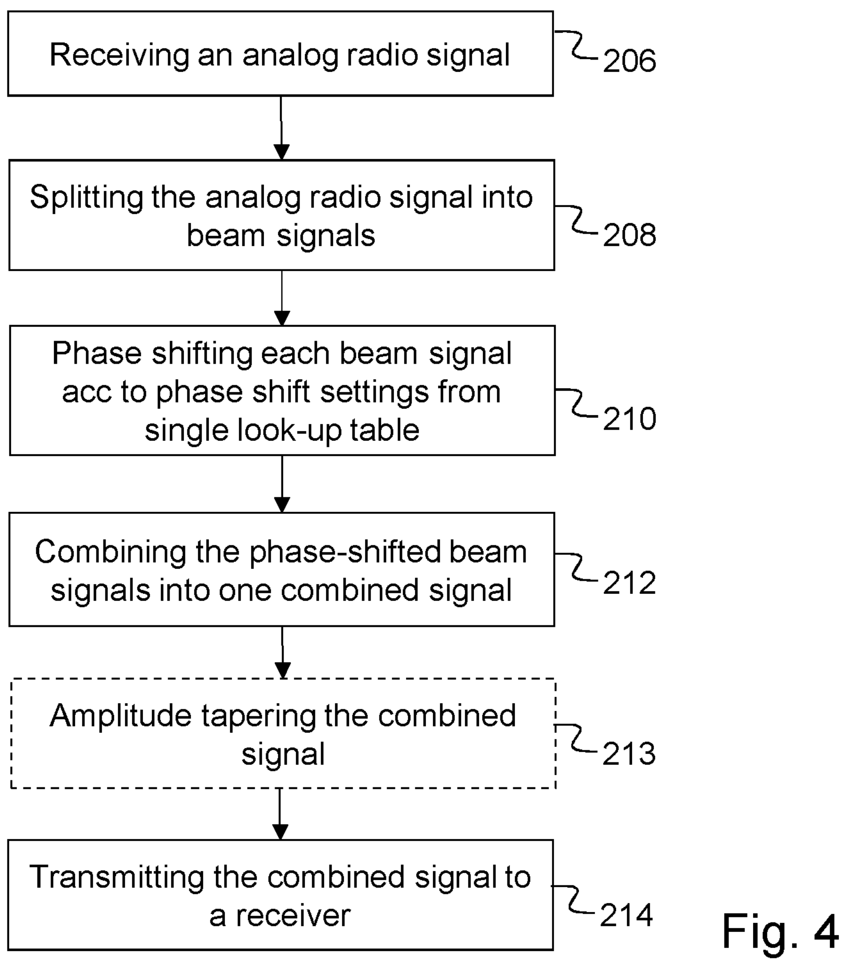
FIG. 4 is a flow chart illustrating a method performed by a transmitter, according to possible embodiments.

FIG. 4, in conjunction with FIG. 2, describes a method for analog beam steering performed by a transmitter 110 of a wireless communication network 100. The transmitter comprises a plurality of antenna branches 114, 115, 116, and each antenna branch comprises an antenna 111, 112, 113. The method comprises, for each antenna branch 114, 115, 116, receiving 206 an analog radio signal, the analog radio signal being the same at each of the antenna branches, splitting 208 the analog radio signal into a number of beam signals, the number of beam signals equals a number of desired beams to be transmitted, the number of beams being at least two. Further, the method comprises, for each of the number of beam signals, phase shifting 210 the beam signal according to a phase shift setting for that beam and for that antenna branch 114, 115, 116, the phase shift settings being taken from a single look-up table that is common for the number of beams, combining 212 the phase shifted beam signals into one combined signal, and transmitting 214 the combined signal from the antenna 111, 112, 113 of that antenna branch 114, 115, 116 towards a receiver 120.

The transmitter 110 may be situated for example in a wireless access node 130 or in a wireless communication device 140. The antennas 111, 112, 113 may for example be arranged in a 1-dimensional array or in a 2-dimensional array. "A single look-up table" signifies that one and the same look-up table is used for phase shifting of all of the beam signals. The single look-up table comprises preset phase shift settings for a certain beam angle and for each antenna branch for that certain transmitter with its antenna configuration. For the phase shifting of different beam signals in the same antenna branch, the transmitter would look up values at different beam angles but at the same antenna branch. For the phase shifting of the same beam signals but for different antenna branches, the transmitter would look up values at the same beam angles but at different antenna branches. For an example of a look-up table, please see Table 1 further down. Especially, see that the columns are marked "Phase shifters", which stands for different phase shifter beam settings" per antenna branch, and the rows that are marked for different beam angles. In other words, for an example with two beams, and the 16-antenna setting of the Table 1 case, if the first beam angle is to be 50° and the second beam angle is to be 100°, the two beam signals of the first antenna is to be phase shifted 115.8 degrees and 31.1 degrees, respectively. In other words, the phase shift values in the table for a beam are independent of how many other beams, if any, that is/are to be transmitted. For a given beam, only a single phase shift value per antenna branch is needed from the table.

By splitting each antenna branch into a number of beam branches, or beam signals, the beam signals per antenna branch equals the number beams that are to be transmitted, and then doing the phase shift separately for each of those beam signals, the inventors have found out that it is possible to use the same look-up table as used for the case when only one beam is to be transmitted. In other words, by inserting an extra splitting and combining step and phase shifting per beam and per antenna branch, the single look-up table used for the one beam case can be reused for two or more beams. As a consequence, very limited control data needs to be sent from a beam management system to the transmitter, as the control data only needs to define at which position in the single look up table to look.

A step of splitting 204 the analog radio signal into a number of analog radio signals that at least equals the number of antenna branches may be inserted before the receiving 206, in order to define that there is first one signal that is split up into each antenna branch, before this split analog radio signal is received 206 at each antenna branch.

According to an embodiment, the method further comprises, for each antenna branch, amplitude tapering 213 the combined signal using an isolation impedance arranged at the antenna branch. By having an isolation impedance located at each antenna branch the inventive transmitter will automatically give a desired amplitude taper to the antenna array without the need for any pre-calculations for the amplitude taper. The isolation impedance may be located at the output of a signal combiner which achieves the combining 212 of the phase shifted beam signals into one combined signal. With "antenna branch" is meant a branch that is "one branch per antenna", i.e. a branch that leads into the antenna, irrespective of if the branch passes any other units before it meets the antenna.

Figure 5:
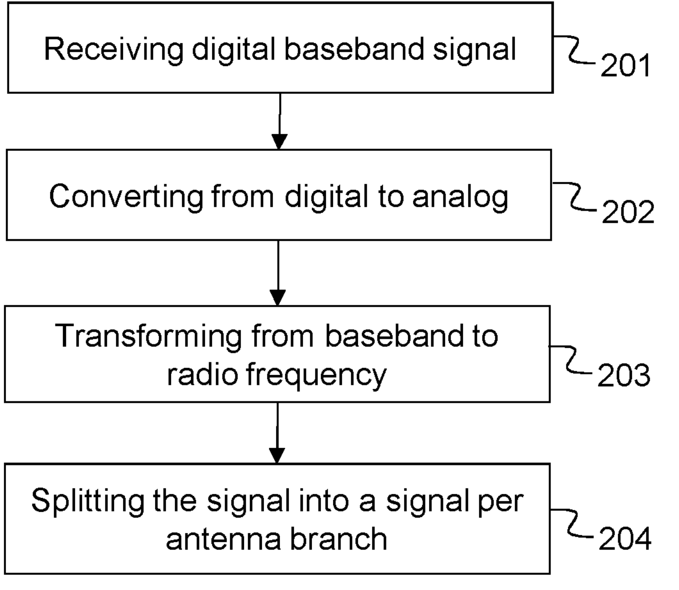
FIG. 5 is another flow chart of a method according to embodiments.

According to another embodiment, which is shown in FIG. 5, the method further comprises, before the analog radio signal is received 206 at each of the antenna branches, receiving 201 a digital baseband signal, converting 202 the signal into an analog form, transforming 203 the signal from baseband frequency into radio frequency, and splitting 204 the signal into a number of signals equaling the number of antenna branches. The converting 202, transforming 203 and splitting 204 may take place in any possible order, as long as the D/A conversion 202 takes place before the splitting 204. For example, the converting 202 from digital to analog form may take place in radio frequency as well as in baseband frequency, i.e. before or after the transforming 203. As another example, the splitting 204 may take place before the transforming 203.

To appreciate the invention, the reader is first introduced to the existing method, which deals with analog beam steering into only one transmitted beam and which only requires one single Look-Up Table (LUT). Thereafter, the reader is shown that the same simple LUT can in fact be re-used to achieve one or several more beams in completely other directions.

First, consider a LUT-supported array antenna where phase settings may come from one entry row crossing all the columns representing phase settings for a certain angular beam position. Then beam steering may be depicted as:

$$P(\theta, \theta_0) = \sum_{n=1}^{N} e^{-j2\pi \cdot nd \cdot cos(\theta_0)} \cdot e^{j2\pi \cdot nd \cdot cos(\theta)} \tag{1)}$$

or $$P(\theta, \theta_0) = \sum_{n=1}^{N} e^{j2\pi \cdot nd \cdot (\cos(\theta) - cos(\theta_0))}, \tag{2)}$$

where θ is a transmission angle, $\theta_0$ is a requested beam angle, d is the distance between antenna elements, aka antennas, and n is the number of antenna elements. It should be noted here that d is given in terms of the wavelength. The radiation patterns, aka transmission patterns, are therefore seemingly normalized and not depending on the frequency. This formulation should not impose any limitation to the general formulation though. Yet another way to describe the radiation pattern is to extract complex amplitudes as in the following formula below:

$$P(\theta, \theta_0) = \sum_{n=1}^{N} A_n{}^{\blacktriangledown} e^{j2\pi \cdot nd \cdot cos(\theta)} \tag{3)}$$

where:

$$A_n = e^{-j2\pi \cdot nd \cdot cos(\theta_0)} \tag{4)}$$

This defines a beam that is pointing towards the direction 80. Here it should be noted that for such a single beam without any tapering to obtain for example lower side lobes, there is no need for the complex amplitude to have any tapering. That is, the magnitude of these amplitudes is unity. The phase shift $\varphi_n$ that has to be applied to each of the elements in the array may be derived by the following:

$$\varphi_n = 360 \cdot n \cdot d \cdot \cos(\theta_0) \tag{5)}$$

Usually the element distance d is defined as being d=λ/2, so in that case it simplifies to:

$$\varphi_n = 180 \cdot n \cdot \cos(\theta_0) \tag{6)}$$

This can be equated for a Grid of Beams (GOB) as a single entry LUT as defined in the exemplary Table 1 below describing an example of a 1D-array in which the present invention may be used. The beam granularity in this example is in steps of 10 degrees each, and the number of elements n in this exemplifying 1D-array is 16.

TABLE 1

| | Phase shifter | | | | | | | | | | | | | | | |
|---|---|---|---|---|---|---|---|---|---|---|---|---|---|---|---|---|
| Beam | 1 | 2 | 3 | 4 | 5 | 6 | 7 | 8 | 9 | 10 | 11 | 12 | 13 | 14 | 15 | 16 |
| 20 | 169.2 | 21.9 | 147.3 | 43.7 | 125.4 | 65.6 | 103.5 | 87.5 | 81.7 | 109.4 | 59.8 | 131.2 | 37.9 | 153.1 | 16.1 | 175.0 |
| 30 | 155.9 | 48.4 | 107.5 | 96.7 | 59.2 | 145.1 | 10.8 | 166.7 | 37.6 | 118.4 | 85.9 | 70.0 | 134.3 | 21.6 | 177.5 | 26.7 |
| 40 | 137.9 | 84.3 | 53.6 | 168.6 | 30.7 | 107.2 | 115.0 | 22.9 | 160.8 | 61.4 | 76.5 | 145.8 | 7.8 | 130.1 | 92.2 | 45.8 |
| → 50 | 115.8 | 128.7 | 12.9 | 102.9 | 141.6 | 25.8 | 90.0 | 154.4 | 38.7 | 77.1 | 167.3 | 51.6 | 64.2 | 179.9 | 64.5 | 51.3 |
| 60 | 90.1 | 180.0 | 89.9 | 0.1 | 90.2 | 179.9 | 89.8 | 0.3 | 90.4 | 179.7 | 89.6 | 0.4 | 90.5 | 179.6 | 89.5 | 0.6 |
| 70 | 61.7 | 123.3 | 175.2 | 113.5 | 51.8 | 9.8 | 71.5 | 133.2 | 165.3 | 103.7 | 42.0 | 19.7 | 81.3 | 143.0 | 155.5 | 93.9 |
| 80 | 31.4 | 62.8 | 94.1 | 125.5 | 156.9 | 171.9 | 140.5 | 109.1 | 77.7 | 46.4 | 15.0 | 16.4 | 47.8 | 79.2 | 110.5 | 141.9 |
| 90 | 30.1 | 0.3 | 0.4 | 0.6 | 0.7 | 0.9 | 1.0 | 1.1 | 1.3 | 1.4 | 1.6 | 1.7 | 1.9 | 2.0 | 2.2 | 2.3 |
| 100 | 31.1 | 62.2 | 93.3 | 124.4 | 155.5 | 173.6 | 142.5 | 111.4 | 80.3 | 49.2 | 18.1 | 13.0 | 44.1 | 75.2 | 106.3 | 137.4 |
| 110 | 61.4 | 122.8 | 176.0 | 114.6 | 53.2 | 8.2 | 69.6 | 131.0 | 167.8 | 106.4 | 45.0 | 16.4 | 77.8 | 139.2 | 159.6 | 98.2 |
| 120 | 89.8 | 179.7 | 90.7 | 0.8 | 89.0 | 178.8 | 91.5 | 1.7 | 88.1 | 178.0 | 92.4 | 2.5 | 87.3 | 177.1 | 93.2 | 3.4 |
| 130 | 115.5 | 129.1 | 13.6 | 102.0 | 142.6 | 27.1 | 88.4 | 156.2 | 40.7 | 74.9 | 169.8 | 54.2 | 61.3 | 176.9 | 67.8 | 47.8 |
| 140 | 137.7 | 84.7 | 53.1 | 169.4 | 31.6 | 106.1 | 116.3 | 21.4 | 159.2 | 63.3 | 74.5 | 148.0 | 10.2 | 127.5 | 94.9 | 42.8 |
| 150 | 155.8 | 48.7 | 107.1 | 97.3 | 58.5 | 146.0 | 9.8 | 165.6 | 38.8 | 116.9 | 87.5 | 68.3 | 136.2 | 19.6 | 175.4 | 29.0 |
| 160 | 169.1 | 22.1 | 147.0 | 44.1 | 124.9 | 66.2 | 102.9 | 88.3 | 80.8 | 110.3 | 58.7 | 132.4 | 36.6 | 154.5 | 14.6 | 176.5 |

An example of a beam LUT with entry marking the beam direction, here 50°, and the output is the phase shifter setting for all 16 antenna elements in a 16-element linear array with 0.5λ antenna element distance. For other beam directions or array configurations, the table values will be different than what is indicated in this example. The table has a pointer towards the row that corresponds to a beam pointing at an angle of 50° in this example. The phase angles indicated in the tabular cells are the phase settings that will be sent to the phase shifters. So, there is no need to compute anything except being able to point towards the correct row.

Now, in order to form a second beam in a different direction from what is defined above, we can simply add another beam expression to Eqn. 1) above. This is formally done as defined below:

$$P(\theta, \theta_0, \theta_1) = \sum_{n=1}^{N} \left(e^{-j2\pi \cdot nd \cdot cos(\theta_0)} + e^{-j2\pi \cdot nd \cdot cos(\theta_1)}\right) \cdot e^{j2\pi \cdot nd \cdot cos(\theta)}, \quad 7)$$

where $\theta_1$ is a requested beam angle for a second beam and $\theta_0$ is a requested beam angle for a first beam. This is equivalent to the following expression for the radiation pattern:

$$P(\theta, \theta_0, \theta_1) = \sum_{n=1}^{N} A_n \cdot e^{j2\pi \cdot nd \cdot cos(\theta)} \quad 8)$$

$$A_n = e^{-j2\pi \cdot nd \cdot cos(\theta_0)} + e^{-j2\pi \cdot nd \cdot cos(\theta_1)} \quad 9)$$

The astute reader will see that this complex value will have different amplitudes depending on the two directions $\theta_0$ and $\theta_1$, and that the resultant phase also will be dependent on the specific values of $\theta_0$ and $\theta_1$. So, it is evident that combining two beams will in this case mean a fairly complicated 2D table at the least. However, looking again at the complex phasors as described by the $A_n$-vector, it opens up a different solution that makes use of the hardware implementation. In specific, if we let two phase shifters be acting upon a split signal and then combine the split signals again, after phase shifting, then the appropriate combined phase will be automatically derived and the necessary amplitude taper will be accounted for by a power loss into an isolated port. Assuming as a first case, the angular direction $\theta_0=\theta_1$, then the total amplitude will be 2 from Eq. 9). If instead, the beam directions are in fact different, then the total amplitude will be anything between 0 and 2, all depending on the indexing 'n' again in Eq. 9). So, the complex summation again after the signal split+individual phase additions, will give an appropriate amplitude to the signal passing through the dual beam (multi beam) phase adjustor. As the combined amplitude differs in each antenna branch, the loss power has to be taken care of somehow, and that is done in a termination/isolation load on the output in case of hybrid combiners, or in an isolation impedance in the case of having a Wilkinson combiner/divider. Such an isolation impedance of a Wilkinson combiner/divider will be arranged between the branches in which the split signals are fed to the combiner.

Figure 6:
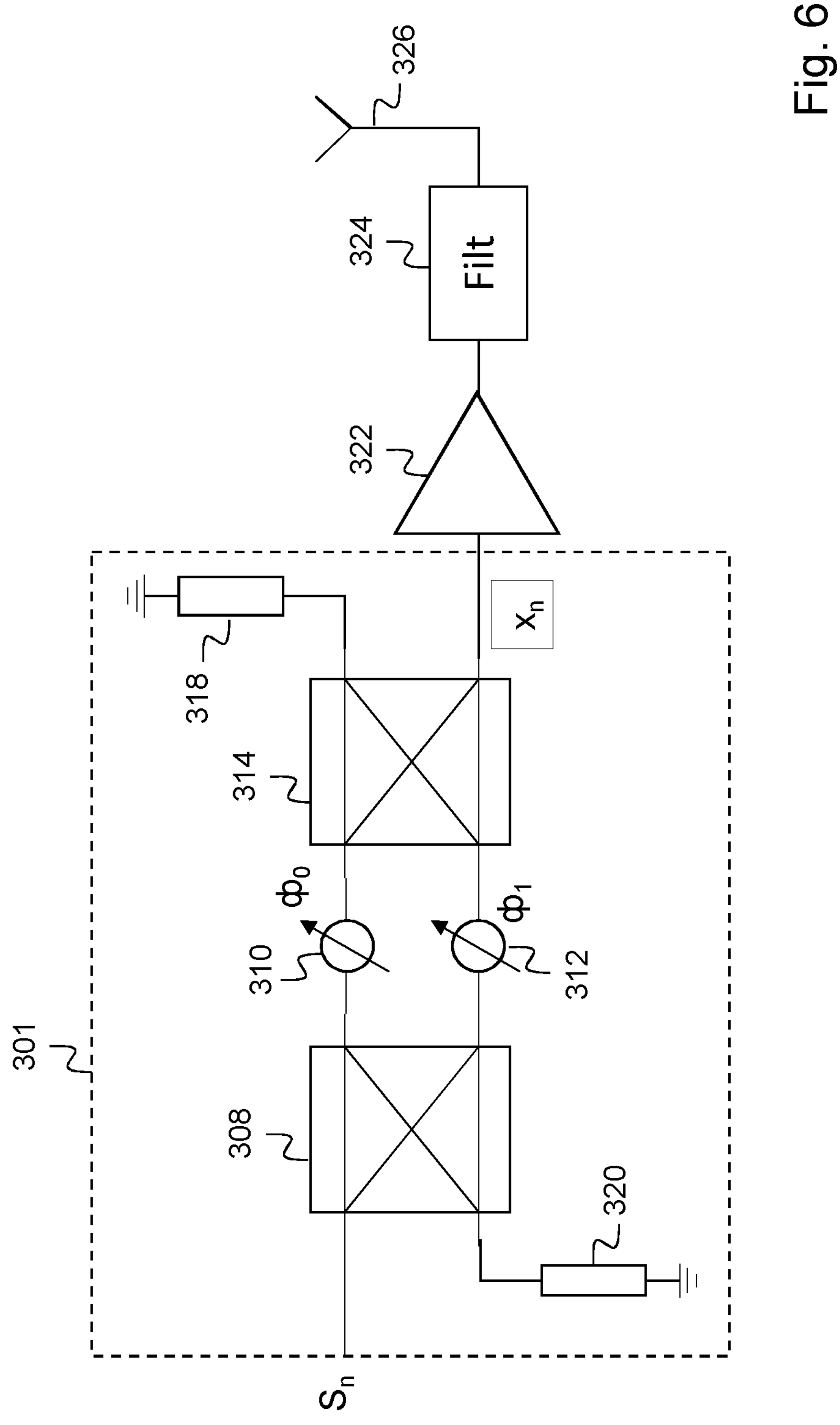
FIG. 6 is a block diagram of a device according to embodiments, arranged in an antenna branch.

According to an embodiment, which is shown in FIG. 6, the following new electrical device 301 has been developed. The electrical device 301, which is a part of the transmitter 110, comprises a signal splitter 308, two phase shifters 310, 312, and signal combiner 314. Such an electrical device is arranged in each antenna branch (see FIG. 1). The electrical device 301 of FIG. 6 works as follows: At each antenna branch, an analog radio signal $S_n$ is received. The analog radio signal is split in a signal splitter 308 into a first and a second beam signal, per antenna branch. The first beam signal is led to a first phase shifter 310. The first phase shifter 310 shifts the first beam signal with a first phase $\varphi_0$ that is according to a value found in the single LUT for a requested first beam angle $\theta_0$. The first phase is different for each antenna branch, see the exemplary Table 1. The second beam signal is led to a second phase shifter 312. The second phase shifter 312 shifts the second beam signal with a second phase $\varphi_1$ that is according to a value found in the single LUT for a requested second beam angle $\theta_1$. Thereafter, the first and second phase shifted beam signals are sent to the signal combiner 314 in which the phase shifted beam signals are combined into a combined signal $x_n$, which can be seen as an output of the electrical device 301. The electrical device 301 is further connected to the antenna 326 via a power amplifier 322 and a filter 324. Consequently, the combined output signal $x_n$ of the electrical device 301 is sent through the power amplifier 322 and the filter 324 to the antenna 326 of the respective antenna branch for wireless transmission to the receiver. Any combining power loss is collected in an isolation resistor 318 arranged on the output of the combiner 314. The combining power loss collected in the isolation resistor 318 will be equal to the necessary taper loss and thereby give the requested beam and taper of side lobes, see further explanation below. A second isolation resistor 320 may be arranged on the input of the signal splitter 308, to take care of any reflecting power that is not absorbed by the isolation resistor 318.

Figure 7:
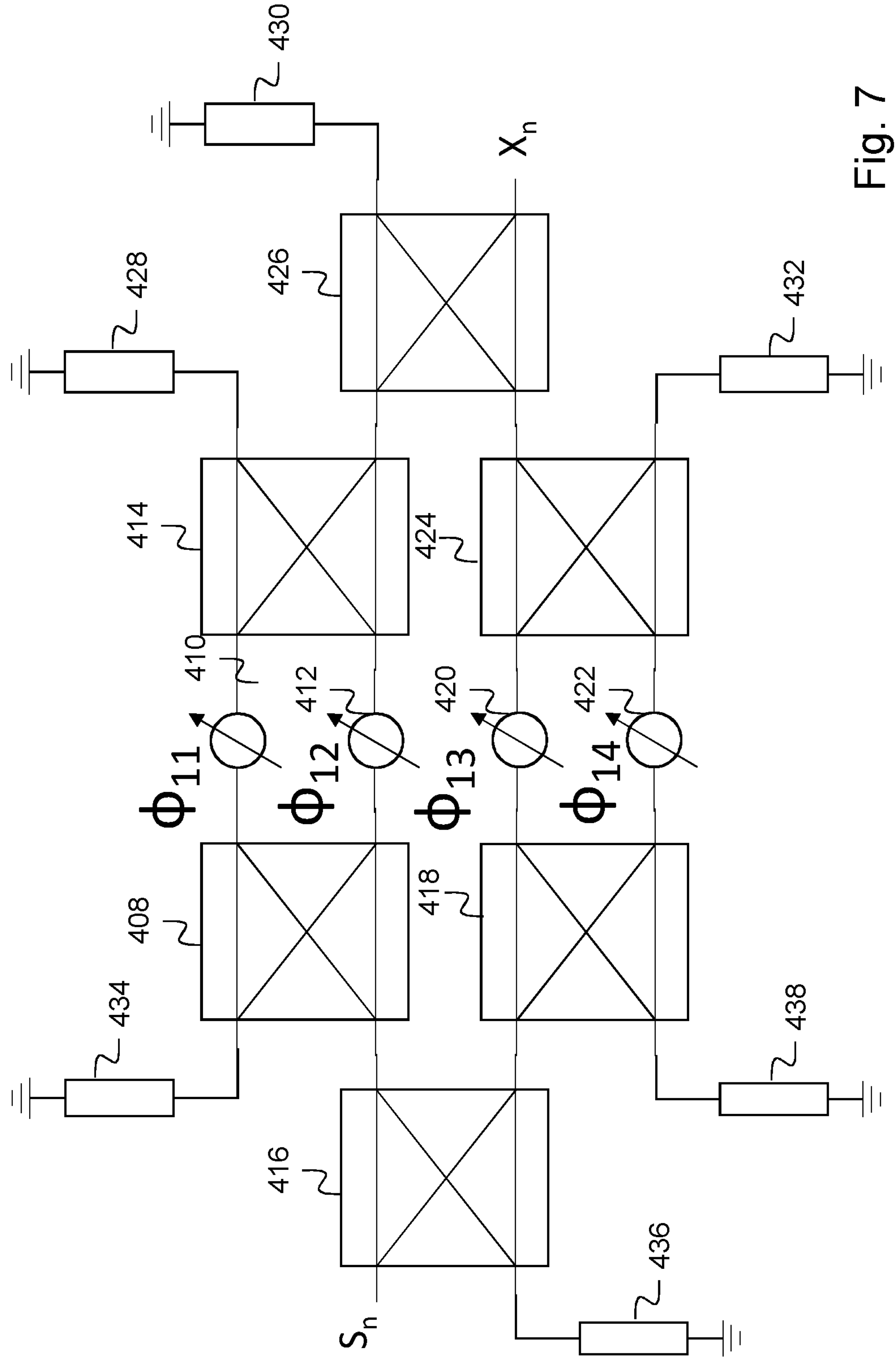
FIG. 7 is another block diagram of devices according to further possible embodiments for a four beam case, the devices being arranged in an antenna branch.

The described device of FIG. 6 makes it possible to achieve two different beams. It should be observed that by repeating the new device, more than two beams can be achieved. An example implementation for achieving four beams is shown in FIG. 7. Here, at each antenna branch, the incoming analog signal $S_n$ is fed through a first signal splitter 416, and then the two split signals are each fed to a signal splitter 408, 418 and each of the two signals are split again, in total making four signals per antenna branch. The four split signals are individually phase-shifted by its own phase shifter 410, 412, 420, 422, according to phase shift data $\varphi_{11}$, $\varphi_{12}$, $\varphi_{13}$, $\varphi_{14}$ taken from a common LUT such as the one shown in Table 1, according to the requested four beam angles. Thereafter, the phase shifted signals are combined in combiners 414, 424, 426 as the combiners shown in FIG. 6 into an output signal $X_n$. FIG. 7 also show possible isolation resistors 428, 430, 432 arranged at the output of the combiners 414, 424, 426 as well as possible isolation resistors 434, 436, 438 arranged at the input of the signal splitters 408, 416, 418.

Figure 8:
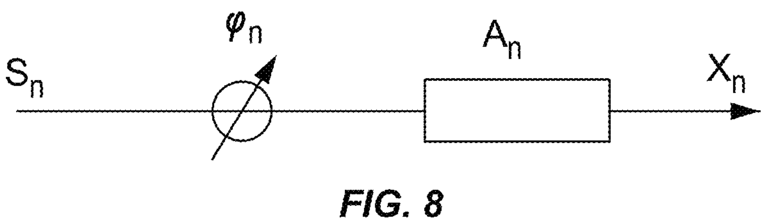
FIG. 8 is a block diagram of an equivalent electrical device.

Further, according to the embodiments above, the combining loss into the isolation resistances 318, 428, 430, 432 on the output of the combiner/combiners 314, 414, 424, 426 will be equal to what would be required by a single combination of phase shifter and attenuator. Thus, it is unnecessary to calculate or tabulate this attenuation, as it is inherently given by the described devices and transmitters. The circuits of FIGS. 6 and 7 will be equal to the circuit functionality of FIG. 8. Thus, FIG. 8 shows a complex phase shifter equivalent $\varphi_n$ and attenuator equivalent $A_n$ for multi-beam phase shifters such as the circuits shown in FIGS. 6 and 7. However, it is not necessary to calculate $A_n$s and $\varphi_n$s separately, we may instead use the first very same LUT but with different entries for the phase settings.

Figure 9:
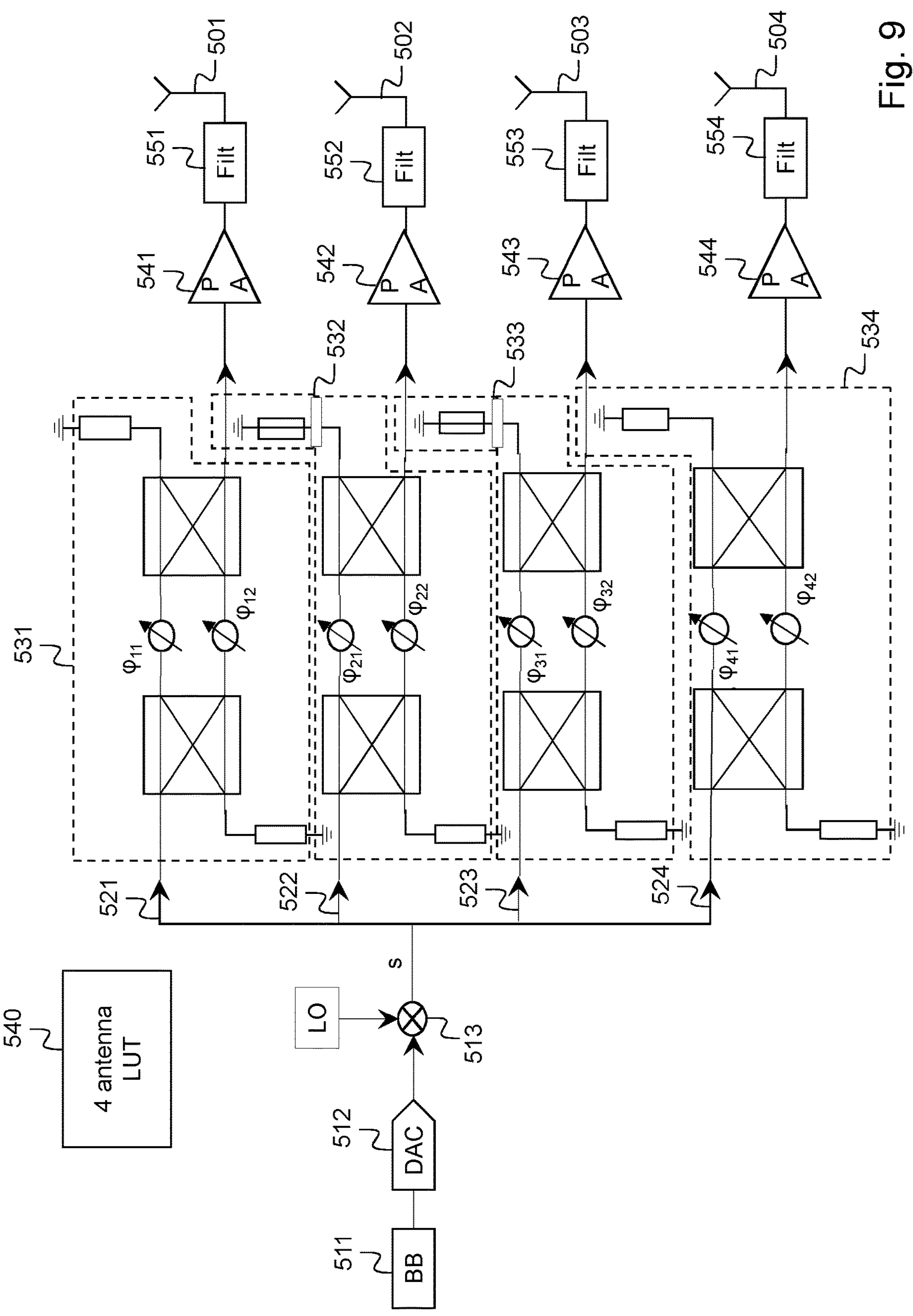
FIG. 9 is a block diagram of a transmitter having four antennas, according to possible embodiments.

FIG. 9 shows an example of a transmitter according to an embodiment, wherein the transmitter has four antennas 501, 502, 503, 504 and two beams are to be transmitted. Further, the transmitter has an obtaining unit 511 that obtains a baseband signal with information that is to be transmitted wirelessly from the antennas 501, 502, 503, 504 to a receiver. The obtaining unit 511 may be a baseband signal generator or the obtaining unit 511 may receive the baseband signal from another unit. The transmitter further comprises a DAC 512 that converts the baseband signal from digital to analog form, and a frequency converter 513 that converts the baseband signal from baseband frequency to radio frequency. In the example of FIG. 9, the frequency converter 513 is a mixer that mixes the baseband signal with a radio frequency signal originating from a local oscillator (LO) in order to achieve the radio signal s to be transmitted. Further, as the transmitter has four antennas, there are four antenna branches 521, 522, 523, 524 into which the radio signal s is split. Each split signal is then fed into one inventive electrical device 531, 532, 533, 534 each. The electrical devices 531, 532, 533, 534 are here exemplified with the electrical device 301 of FIG. 6. The incoming signal s is split and phase-shifted in each antenna branch 521, 522, 523, 524. The phase settings for each of the respective phase shifters of each antenna branch 521, 522, 523, 524 are taken from a LUT 540 adapted for this 4-antenna configuration. As an example, the first phase shifters of each antenna branch get their phase settings $\varphi_{11}$, $\varphi_{21}$, $\varphi_{31}$, $\varphi_{41}$ from the LUT 540 at a first beam angle row, e.g. 50°, and the second phase shifters of each antenna branch get their phase settings $\varphi_{12}$, $\varphi_{22}$, $\varphi_{32}$, $\varphi_{42}$ from the LUT 540 at a second beam angle row, e.g. 100°. After, the phase shifting, the two phase-shifted signals of each antenna branch 521, 522, 523, 524 are combined in the combiner of each electrical device 531, 532, 533, 534. The resulting combined signal of each antenna branch 521, 522, 523, 524 is sent to the antenna of the antenna branch via a power amplifier 541, 542, 543, 544 and a filter 551, 552, 553, 554.

Figure 10:
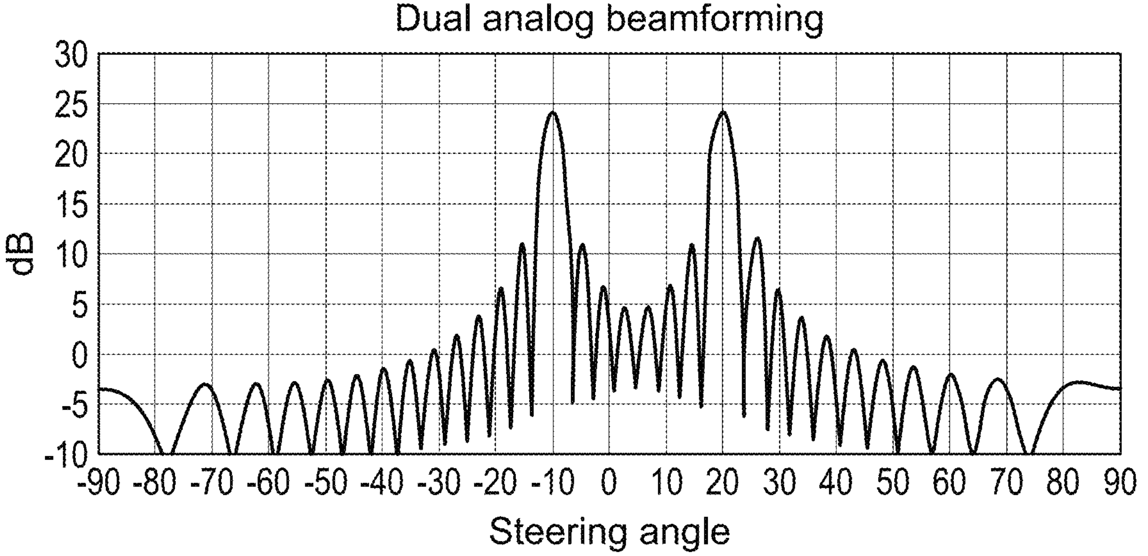
FIG. 10 is an xy-diagram shows a resulting transmission from an embodiment having 32 antennas, wherein two beams are neatly formed in desired directions.

As a real case of dual beam excitation, we may take a 32-element example that is given a complex amplitude combination as to produce a dual beam in directions −10° and +20° off broadside. The resulting transmission pattern is shown in FIG. 10, with beam steering angle on the x-axis and signal strength in dB on the y-axis. The transmission pattern shows a side lobe roll-off that is consistent with the common Sin(x)/x pattern that is obtained for large continuous antenna apertures.

Figure 11:
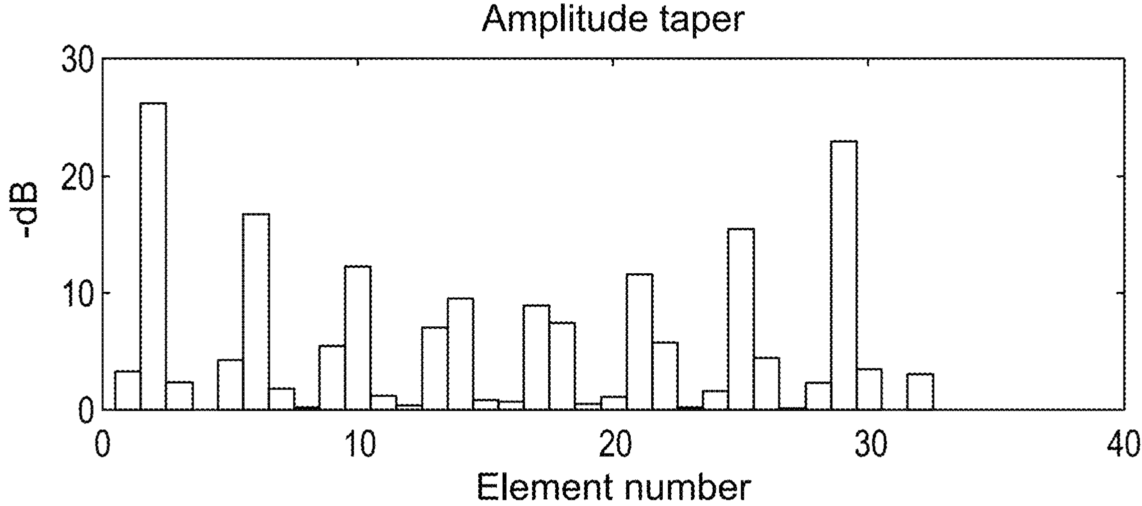
FIG. 11 is an xy-diagram showing amplitude taper from the 32-antenna embodiment of FIG. 10.

The transmission pattern is obtained by a transmitter as the one described in FIG. 10 above by using a similar single-entry table as in Table 1. However, in the −10, +20° example, 0° resembles 90 degrees in Table 1, in other words, −10° is like 80° and +20° is like 110° in Table 1. The corresponding amplitude taper that will occur at the antenna elements from the combined phase-shifter structure is a depicted in FIG. 11 for this particular beam angle setup, with antenna element number on the x-axis and attenuation in −dB on the y-axis. It should be noted that the amplitude taper will be accomplished by a relative power loss into some isolation port in the phase shifter network. The correct complex amplitude and phase settings will be given to the array by just picking those two entries as given by the steering angles −10° and +20° in this case from one only Look-up Table. The summation over the array tapers of FIG. 11 corresponds to a −3 dB total tapering loss.

According to an embodiment, the phase shifters shown above may be changed to True Time Delay units. Further, according to another embodiment, the characteristics for the suggested implementations is that the common taper loss is equal to $10 \cdot \log_{10}(N)$ where N is the number of beams to support: that is, 3, 6 and 9 dB loss for 2, 4, and 8 beams, respectively. The directivity per beam will also decrease as much as the tapering loss. In the end, the Equivalent Isotropically Radiated Power (EIRP) will lose 6, 12, and 16 dB for 2, 4, and 8 beams respectively. This is regardless of implementation. However, it should be remembered that the taper loss is being experienced before the amplification at low power, so the real implication would rather be on the split of directivity among the different beams.

Figure 1:
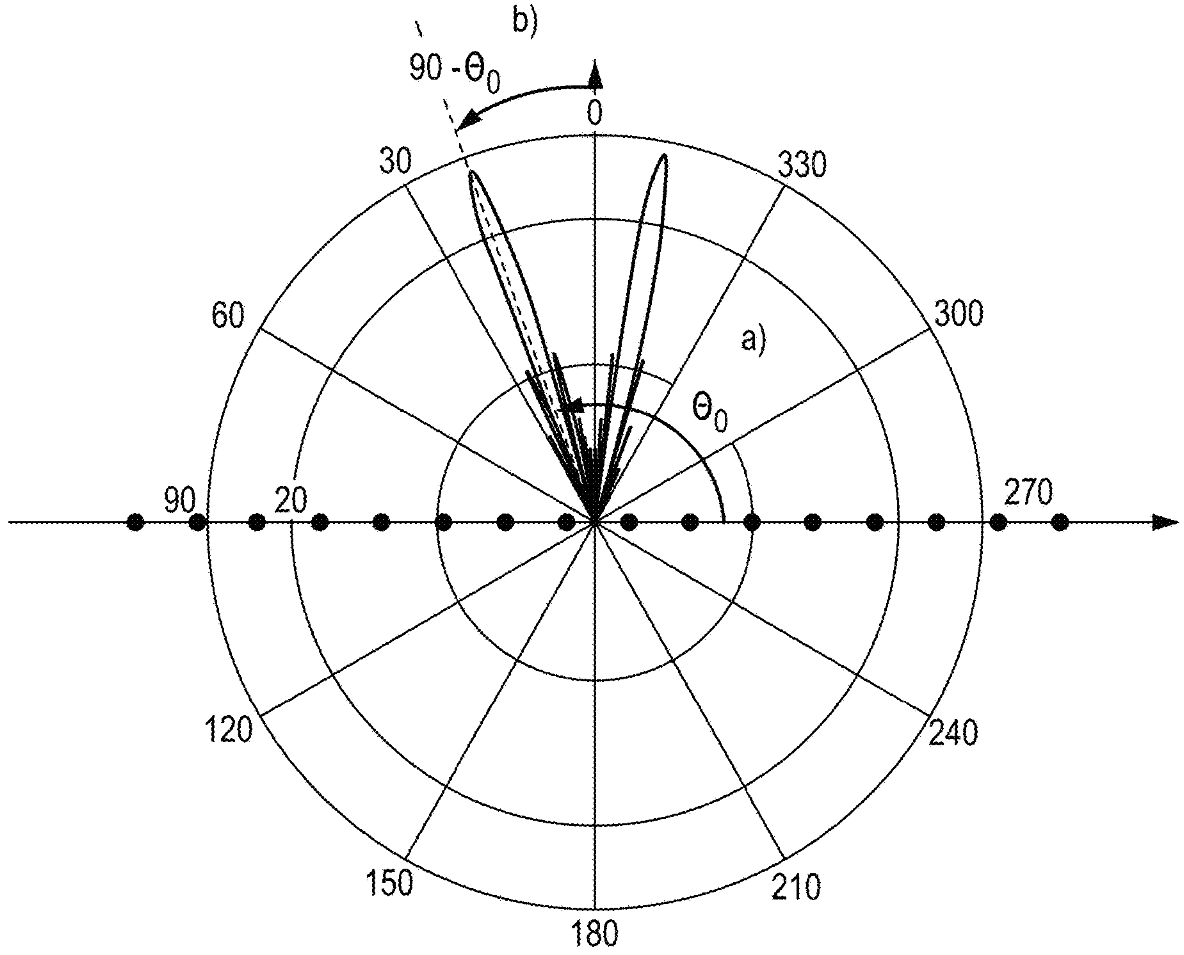
FIG. 1 is a diagram of an exemplifying dual beam antenna array pattern that may be produced by the present invention.

Further, with reference to FIG. 1 and FIG. 6, the latter describing details of an antenna branch, a transmitter 110 is described that is configured for analog beam steering. The transmitter comprises a plurality of antenna branches 114, 115, 116. Each antenna branch comprises an antenna 111, 112, 113. The transmitter 110 comprises, at each of the antenna branches 114, 115, 116, a signal splitter 308 for receiving an analog radio signal, the analog radio signal being the same at each of the antenna branches, the signal splitter 308 further being arranged for splitting the analog radio signal into a number of beam signals, the number of beam signals equals a number of desired beams to be transmitted, the number of beams being at least two. The transmitter 110 further comprises, for each of the number of beam signals, a phase shifter 310, 312 for phase shifting the beam signal according to a phase shift setting for that beam and for that antenna branch, the phase shift settings being taken from a single look-up table, and a signal combiner 314 for combining the phase-shifted beam signals into one combined signal. Further, the transmitter 110 is arranged for transmitting the combined signal from the antenna 111, 112, 113 of that antenna branch 114, 115, 116 towards a receiver 120. The transmitter 110 can be situated at a radio access network node or at a wireless communication device, for example. The antennas 111, 112, 113 may for example be arranged in a 1-dimensional array or a 2-dimensional array.

According to an embodiment, the transmitter 110 further comprises, for each antenna branch 114, 115, 116 and at the signal combiner 314, an isolation impedance 318 for amplitude tapering of the signal. By having an isolation impedance 318 located at each antenna branch at the signal combiner 314, the inventive transmitter will automatically give a desired amplitude taper to the antenna array without the need for any pre-calculations for the amplitude taper. The isolation impedance 318 may have a value designed according to the used type of signal combiner, such as 50 or 100Ω. With such an isolation impedance it is aimed at attaining impedance matching on the branch so that no power is reflected back into a generator of the signal, which otherwise would have risked the generator, if the generator is not prepared for taking up such reflecting power. According to an embodiment, the signal splitter 308 is a hybrid power splitter and the signal combiner 314 is a hybrid combiner. Further, the isolation impedance 318 is arranged at the output of the signal combiner 314 between the respective antenna branch 114, 115, 116 and ground.

According to another embodiment, the signal splitter 308 is a Wilkinson divider and the signal combiner 314 is a Wilkinson combiner. Further, each antenna branch 114, 115, 116 is split up into a number of beam branches, the number of which equals the number of beam signals, and the isolation impedance 318 is arranged between at least two of the number of beam branches at the input of the signal combiner 314.

According to another embodiment, the transmitter 110 further comprises, for each antenna branch 114, 115, 116, a second isolation impedance 320 arranged at the input of the signal splitter 308. By having such a second, additional isolation impedance 320, arranged at the input of the signal splitter, any power reflecting towards the generator due to any mismatch of the isolation impedance 318 at the signal combiner 314 can be taken up by the second isolation impedance.

According to another embodiment, the phase shifters 310, 312 are realized as True Time Delay units.

Figure 12:
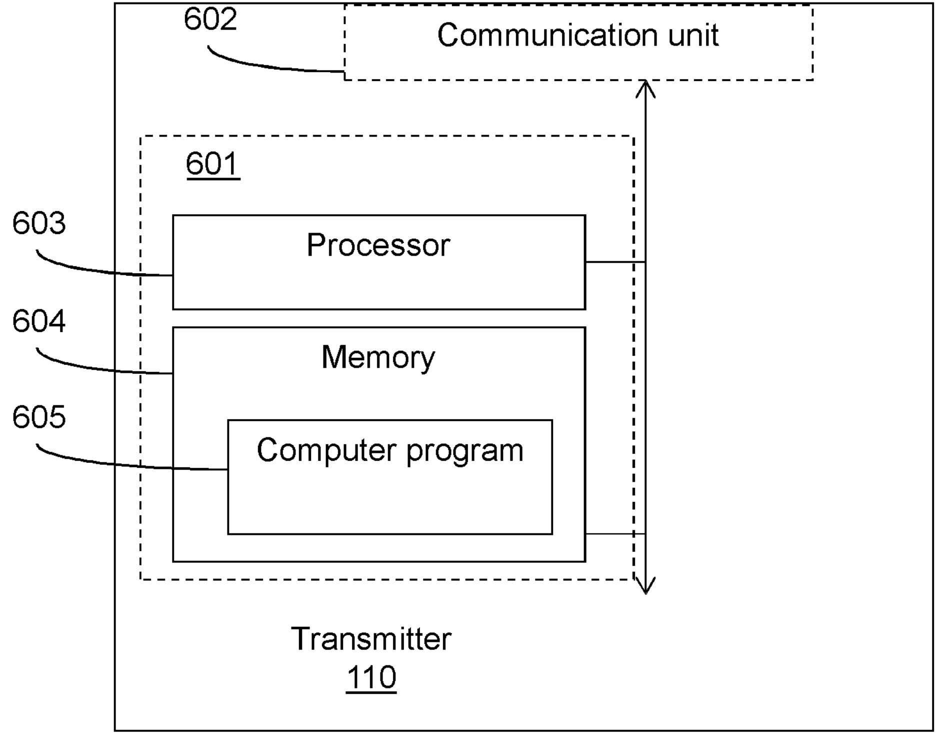
FIG. 12 is a block diagram of a transmitter according to embodiments.

FIG. 12 describes another embodiment of a transmitter 110 operable in a wireless communication system 100 and configured for analog beam steering. The transmitter 110 comprises a processing circuitry 603 and a memory 604.

Said memory contains instructions executable by said processing circuitry 603, whereby the transmitter 110 is operative for receiving an analog radio signal, the analog radio signal being the same at each of the antenna branches, and splitting the analog radio signal into a number of beam signals, the number of beam signals equals a number of desired beams to be transmitted, the number of beams being at least two. Further, the transmitter 110 is operative for, for each of the number of beam signals, phase shifting the beam signal according to a phase shift setting for that beam and for that antenna branch 114, 115, 116, the phase shift settings being taken from a single look-up table that is common for the number of beams, combining the phase shifted beam signals into one combined signal, and transmitting the combined signal from the antenna 111, 112, 113 of that antenna branch towards a receiver 120.

According to an embodiment, the transmitter 110 is further operative for, for each antenna branch 114, 115, 116, amplitude tapering the combined signal using an isolation impedance arranged at the antenna branch.

According to an embodiment, the transmitter 110 is further operative for, before the analog radio signal is received at each of the antenna branches 114, 115, 116: receiving a digital baseband signal; converting the signal into an analog form; transforming the signal from baseband frequency into radio frequency, and splitting the signal into a number of signals equaling the number of antenna branches.

According to other embodiments, the transmitter 110 may further comprise a communication unit 602, which may be considered to comprise conventional means for wireless communication with the receiver 120. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the transmitter 110 to perform the steps described in any of the described embodiments of the transmitter 110 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the transmitter 110 has access via the communication unit 602. The computer program 605 may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for analog beam steering performed by a transmitter of a wireless communication network, the transmitter comprising a plurality of antenna branches, each antenna branch comprising an antenna, the method comprising, for each antenna branch:
- receiving an analog radio signal, the analog radio signal being the same at each of the antenna branches;
- splitting the analog radio signal into a number of beam signals, the number of beam signals equals a number of desired beams to be transmitted, the number of beams being at least two;
- for each of the beam signals, phase shifting the beam signal according to a phase shift setting for that beam and for that antenna branch, the phase shift settings being taken from a single look-up table that is common for the number of beams;
- combining the phase shifted beam signals into one combined signal; and
- transmitting the combined signal from the antenna of that antenna branch towards a receiver.

2. The method of claim 1, further comprising:
- for each antenna branch, amplitude tapering the combined signal using an isolation impedance arranged at the antenna branch.

3. The method of claim 2, wherein the amplitude tampering is performed without calculating or tabulating an attenuation of the amplitude tampering.

4. The method of claim 2, wherein the isolation impedance is configured such that no power is reflected back into a generator of the signal.

5. The method of claim 1, further comprising, before the analog radio signal is received at each of the antenna branches:
- receiving a digital baseband signal;
- converting the signal into an analog form;
- transforming the signal from baseband frequency into radio frequency, and
- splitting the signal into a number of signals equaling the number of antenna branches.

6. The method of claim 1, wherein the phase shift setting for each of the beam signals is independent of the number of beam signals to be transmitted.

7. The method of claim 1, wherein the single look-up table that is common for the number of beams does not comprise amplitude taper values.

8. The method of claim 1, wherein, for each of the beam signals, only one phase shift setting for the antenna branch is used from the single look-up table.

9. A transmitter configured for analog beam steering, the transmitter comprising a plurality of antenna branches, each antenna branch comprising an antenna, the transmitter comprising, at each of the antenna branches:

a signal splitter for receiving an analog radio signal, the analog radio signal being the same at each of the antenna branches, the signal splitter further being arranged for splitting the analog radio signal into a number of beam signals, the number of beam signals equals a number of desired beams to be transmitted, the number of beams being at least two;

for each of the beam signals, a phase shifter for phase shifting the beam signal according to a phase shift setting for that beam and for that antenna branch, the phase shift settings being taken from a single look-up table;

a signal combiner for combining the phase shifted beam signals into one combined signal, and wherein the transmitter is arranged for transmitting the combined signal from the antenna of that antenna branch towards a receiver.

10. The transmitter of claim 9, further comprising, for each antenna branch and at the signal combiner, an isolation impedance for amplitude tapering of the signal.

11. The transmitter of claim 10, wherein the signal splitter is a hybrid power splitter and the signal combiner is a hybrid combiner, and wherein the isolation impedance is arranged at the output of the signal combiner 314 between the respective antenna branch and ground.

12. The transmitter of claim 10, wherein the signal splitter is a Wilkinson divider and the signal combiner is a Wilkinson combiner, and wherein each antenna branch is split up into a number of beam branches, the number of which equals the number of beam signals, and wherein the isolation impedance is arranged between at least two of the number of beam branches at the input of the signal combiner.

13. The transmitter of claim 10, further comprising, for each antenna branch, a second isolation impedance arranged at the input of the signal splitter.

14. The transmitter of claim 9, wherein the phase shifters are realized as True Time Delay units.

15. A transmitter operable in a wireless communication system configured for analog beam steering, the transmitter comprising a processing circuitry and a memory, said memory containing instructions executable by said processing circuitry, whereby the transmitter is operative for:

receiving an analog radio signal, the analog radio signal being the same at each of the antenna branches;

splitting the analog radio signal into a number of beam signals, the number of beam signals equals a number of desired beams to be transmitted, the number of beams being at least two;

for each of the beam signals, phase shifting the beam signal according to a phase shift setting for that beam and for that antenna branch, the phase shift settings being taken from a single look-up table that is common for the number of beams; and combining the phase shifted beam signals into one combined signal, and transmitting the combined signal from the antenna of that antenna branch towards a receiver.

16. The transmitter of claim 15, further being operative for:

for each antenna branch, amplitude tapering the combined signal using an isolation impedance arranged at the antenna branch.

17. The transmitter of claim 15, further being operative for, before the analog radio signal is received at each of the antenna branches:

receiving a digital baseband signal;

converting the signal into an analog form;

transforming the signal from baseband frequency into radio frequency, and splitting the signal into a number of signals equaling the number of antenna branches.

18. A non-transitory computer readable storage medium storing a computer program comprising instructions, which, when executed by processing circuitry of a transmitter of a wireless communication network, configured for analog beam steering, causes the transmitter to perform the following steps:

receiving an analog radio signal, the analog radio signal being the same at each of the antenna branches;

splitting the analog radio signal into a number of beam signals, the number of beam signals equals a number of desired beams to be transmitted, the number of beams being at least two;

for each of the number of beam signals, phase shifting the beam signal according to a phase shift setting for that beam and for that antenna branch, the phase shift settings being taken from a single look-up table that is common for the number of beams;

combining the phase shifted beam signals into one combined signal, and transmitting the combined signal from the antenna of that antenna branch towards a receiver.

* * * * *